(12) United States Patent
Linderholm

(10) Patent No.: US 7,179,028 B2
(45) Date of Patent: Feb. 20, 2007

(54) DEVICE FOR FIXATION OF A PORTABLE DRILLING OR MILLING MACHINE ON A TEMPLATE FOR MAKING HOLES IN A WORKPIECE, AND AN ORBITAL MACHINING APPARATUS FOR PRODUCING SUCH HOLES

(75) Inventor: Dag Linderholm, Rönninge (SE)

(73) Assignee: Novator AB, Spanga (SE)

( * ) Notice: Subject to any disclaimer, the term of this patent is extended or adjusted under 35 U.S.C. 154(b) by 0 days.

(21) Appl. No.: 10/528,294

(22) PCT Filed: Sep. 16, 2003

(86) PCT No.: PCT/SE03/01445

§ 371 (c)(1),
(2), (4) Date: Aug. 24, 2005

(87) PCT Pub. No.: WO2004/024376

PCT Pub. Date: Mar. 25, 2004

(65) Prior Publication Data

US 2006/0165500 A1    Jul. 27, 2006

Related U.S. Application Data

(60) Provisional application No. 60/410,813, filed on Sep. 16, 2002.

(51) Int. Cl.
*B23C 1/20* (2006.01)
(52) U.S. Cl. ................... 409/179; 409/130; 409/200; 409/143; 408/97; 408/98

(58) Field of Classification Search ........ 409/178–179, 409/130, 143, 137, 200, 191, 182, 180; 408/95, 408/97, 98; 144/154.5, 136.95
See application file for complete search history.

(56) References Cited

U.S. PATENT DOCUMENTS 2,541,306 A * 2/1951 Taylor ..................... 408/97

(Continued)

FOREIGN PATENT DOCUMENTS

DE          41 18 104       11/1992

(Continued)

*Primary Examiner*—Erica E. Cadugan
(74) *Attorney, Agent, or Firm*—Taylor & Aust, P.C.

(57) ABSTRACT

A device for the temporary fixation of a portable cutting machine to a template for making holes and/or recesses in a workpiece including a guide sleeve and a tensioning unit. The guide sleeve includes a tubular hub with an outer diameter corresponding to an inner diameter of an aperture in the template, a forward end of the hub having radially extending lugs configured and located so as to match corresponding recesses in the aperture during the insertion of the guide sleeve therein and to obtain a locking engagement with an inner surface of the template after a partial rotation of the guide sleeve relative to the template. A rearward end of the hub has a tubular adapter socket that is mounted to a nose portion of the cutting machine. The tensioning unit is mounted to the adapter socket for axial displacement relative thereto and having a forward end surface for engagement with an outer surface of the template.

5 Claims, 7 Drawing Sheets

U.S. PATENT DOCUMENTS

| | | | | |
|---|---|---|---|---|
| 3,756,736 | A | * | 9/1973 | Marcoux .................. 408/72 B |
| 4,507,026 | A | * | 3/1985 | Lund .......................... 408/97 |
| 4,557,646 | A | * | 12/1985 | Biek ......................... 409/218 |
| 4,599,018 | A | * | 7/1986 | Woods ....................... 409/178 |
| 4,668,134 | A | * | 5/1987 | Vindez ....................... 408/97 |
| 4,850,755 | A | * | 7/1989 | Spencer ................... 408/72 B |
| 5,088,171 | A | | 2/1992 | Suzuki |
| 5,117,879 | A | * | 6/1992 | Payne ........................ 409/182 |
| 5,161,923 | A | * | 11/1992 | Reccius ....................... 408/95 |
| 6,382,890 | B1 | | 5/2002 | Linderholm |
| 6,902,361 | B2 | * | 6/2005 | Pettersson et al. .......... 409/178 |

FOREIGN PATENT DOCUMENTS

| | | |
|---|---|---|
| DE | 41 25 501 | 2/1993 |
| EP | 0761351 | 12/1997 |
| WO | WO94/17944 | 8/1994 |
| WO | WO 01/15843 | 3/2001 |

* cited by examiner

DEVICE FOR FIXATION OF A PORTABLE DRILLING OR MILLING MACHINE ON A TEMPLATE FOR MAKING HOLES IN A WORKPIECE, AND AN ORBITAL MACHINING APPARATUS FOR PRODUCING SUCH HOLES

The present application is the national stage of PCT/SE03/01445, filed Sep. 16, 2003, which claims priority to U.S. provisional application 60/410,813, filed Sep. 16, 2002.

BACKGROUND OF THE INVENTION

1. Field of the Invention

The present invention relates to a device for providing an improved temporary fixation of a drilling or milling machine on a template for making holes and/or recesses at predetermined locations in a workpiece, and, more particularly to temporarily fixate a portable orbital drilling machine to a template which is mounted onto a workpiece.

2. Description of the Related Art

International publications WO 94/17944 and WO 01/15870 disclose early embodiments of devices for fixation of a portable hand tool apparatus to a template for producing holes in a workpiece. These devices include a sleeve, which is attached to a template aperture by way of screw joints. This requires threaded holes to be formed in the template and separate screws therefor.

SUMMARY OF THE INVENTION

An object of the present invention is to eliminate the need for screw joints when temporarily fixating a hand tool apparatus in an aperture of the template and to provide a fixation device, which facilitates and improves the attachment of the hand tool apparatus to the template.

To this end the device of the present invention for temporary fixation of a portable cutting machine to a template for making holes and/or recesses in a workpiece, comprises a guide sleeve having a tubular hub with an outer diameter corresponding to an inner diameter of an aperture in the template, a forward end of the hub having radially extending lugs configured and located so as to match corresponding recesses in the aperture during insertion of the guide sleeve therein and to obtain a locking engagement with an inner surface of the template after a partial rotation of the guide sleeve relative to the template, and a rearward end of the hub being connected to a tubular adapter socket to be mounted to a nose portion of the cutting machine; and a tensioning unit mounted to the adapter socket for axial displacement relative thereto and having a forward end surface for engagement with an outer surface of the template.

Further features and details of the present invention are set forth in the following claims and will be disclosed in the following detailed description with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
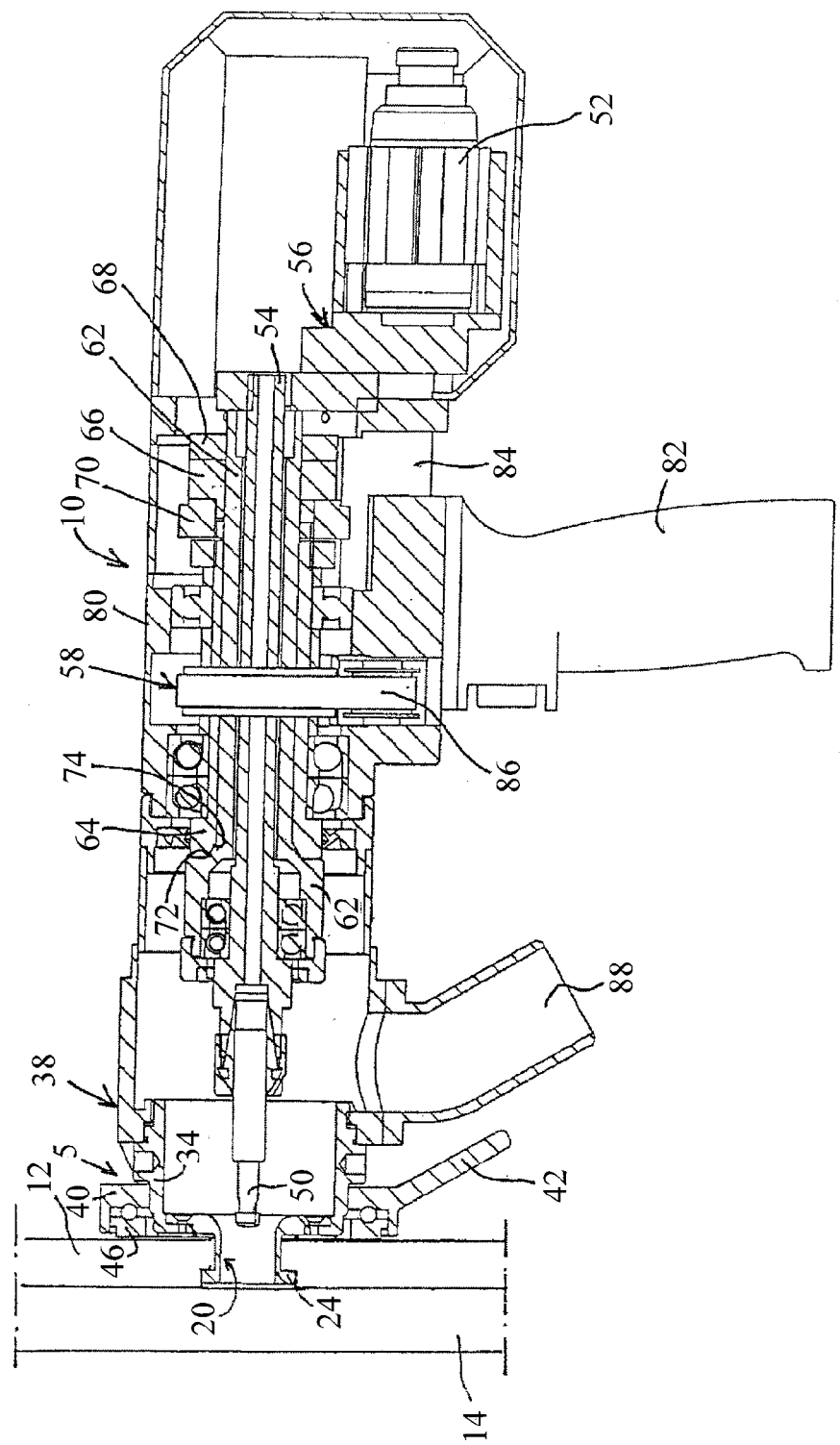
FIG. 1 is a longitudinal sectional view of a portable hand tool apparatus attached to a template for making holes in a workpiece using an embodiment of a fixation device of the present invention.

Referring now to the drawings and more particularly to FIG. 1, there is illustrated a portable hand tool machine 10 for orbital drilling of holes, or recesses, in a workpiece 14. For temporarily fixating machine 10 to a template 12 having apertures 16 located at spots where holes are to be formed in the workpiece, a fixation device 5 of the present invention is used.

Figure 2:
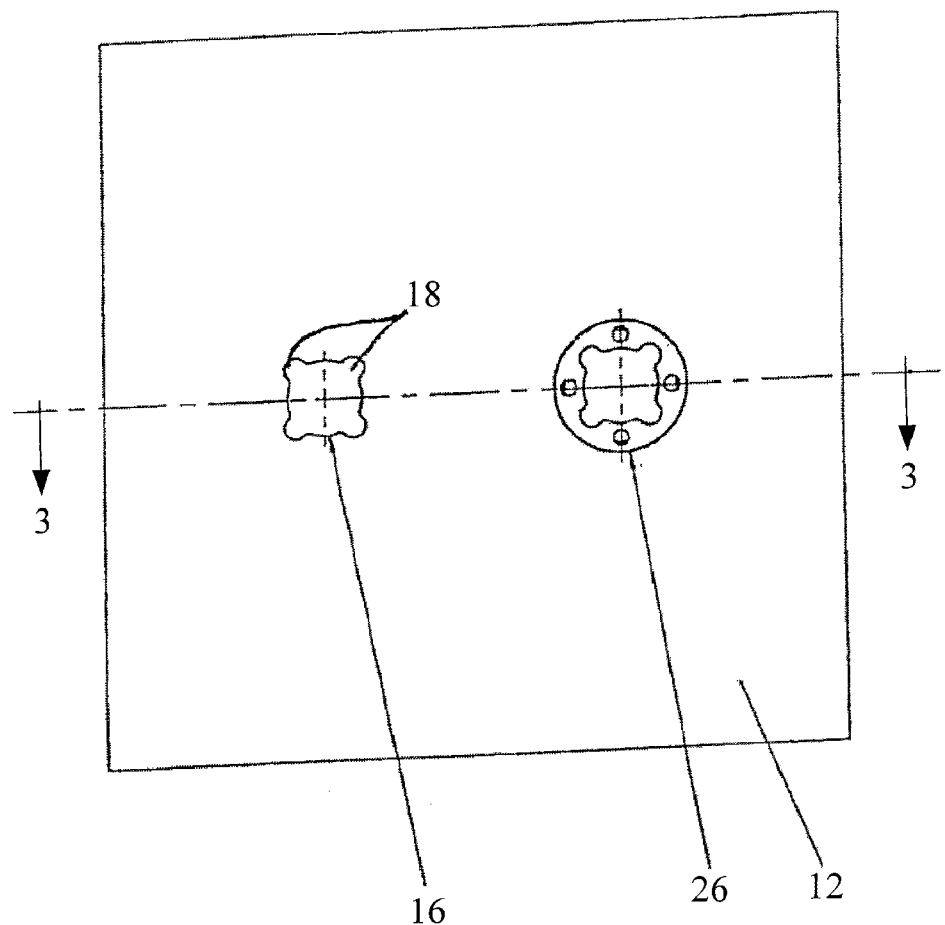
FIG. 2 is a view of a backside of a template having two types of apertures for receiving a guide sleeve of a fixation device of the present invention.
Figure 3:
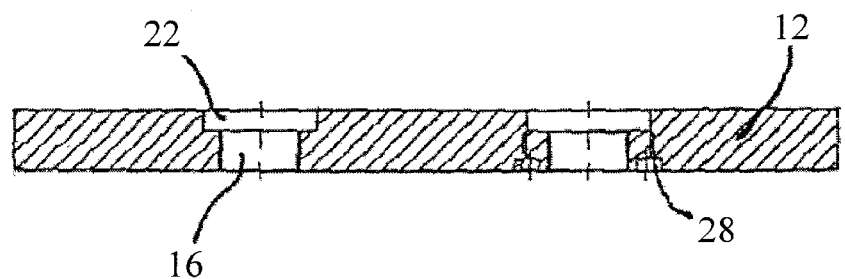
FIG. 3 is a cross-section of the template taken along line 3—3 of FIG. 2.
Figure 4:
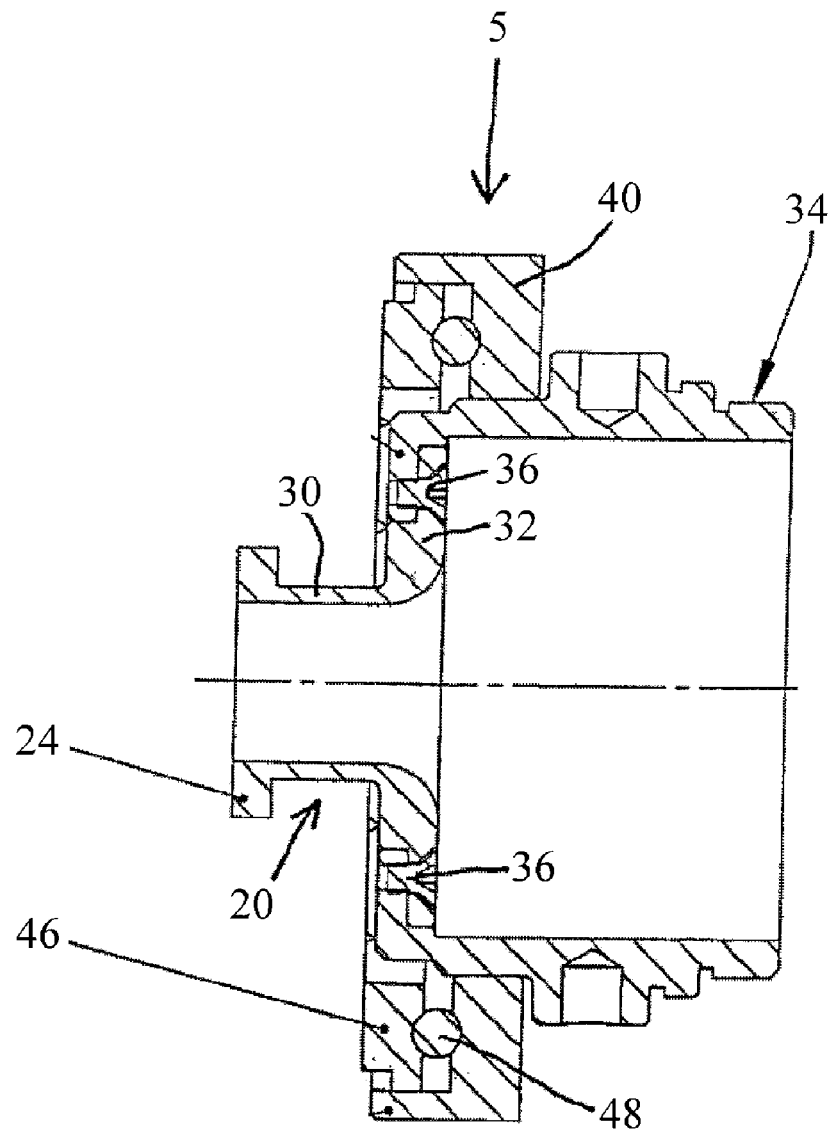
FIG. 4 is a longitudinal cross-sectional view of the fixation device of FIG. 1.
Figure 5:
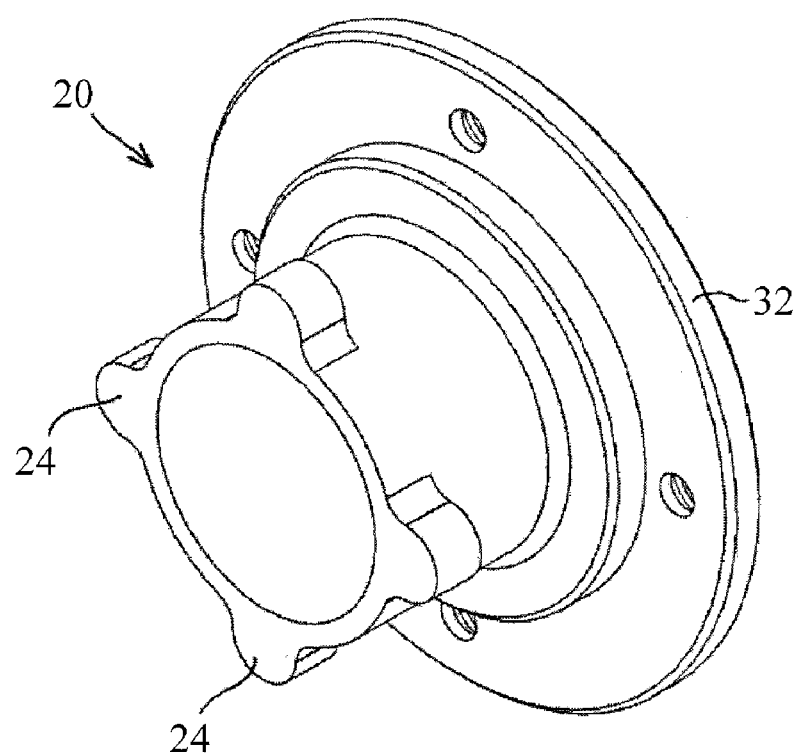
FIG. 5 is a perspective view of the guide sleeve of the fixation device of FIGS. 1 and 4.

Now, additionally referring to FIGS. 2–5, there is shown to the left in FIG. 2, each aperture 16 in template 12 has a circular configuration with at least one, but preferably a plurality of, for example, four axial recesses or grooves 18 at the periphery of the aperture for receiving a guide sleeve 20 (FIG. 4) of fixation device 5, which is mounted to the front end of drilling machine 10. A recess 22, as shown in (FIG. 3), adjoins aperture 16 on the template backside facing the workpiece for receiving correspondingly profiled protrusions or lugs 24, as shown in FIGS. 4 and 5 on guide sleeve 20 without engaging the surface of the workpiece. Alternatively, each profiled aperture in template 12 may be formed as a detachable insert 26 secured by threads to template 12, as shown to the right in FIGS. 2 and 3. Template 12 may be made of any suitable metal, plastic or composite material and can be made flat or curved in one or more directions.

As shown in FIGS. 1, 4 and 5, guide sleeve 20 of fixation device 5 has a tubular hub 30 with an outer diameter corresponding, accurately, to the inner diameter of aperture 16. The forward end of hub 30 has four protrusions or lugs 24 configured and located to match grooves 18, and at the rearward end of hub 30 there is a base plate 32 to which is mounted an adapter or fixture socket 34 by way of screws 36. Socket 34 is mounted to a nose portion 38 of drilling machine 10. A tension ring 40, having three turning wings 42, is threaded onto the outer periphery of socket 34 and engages a pressure plate 46, which is configured to rest against the outer surface of template 12 and is axially and rotatably supported relative to tension ring 40 by way of a bearing 48. In case of a template having a curved outer surface, such as a spherically curved surface, pressure plate 46 may include three or more pressure elements (not shown), which are individually articulated by ball joints so as to be automatically adjustable to the inclination of the surface of template 12.

Figure 6:
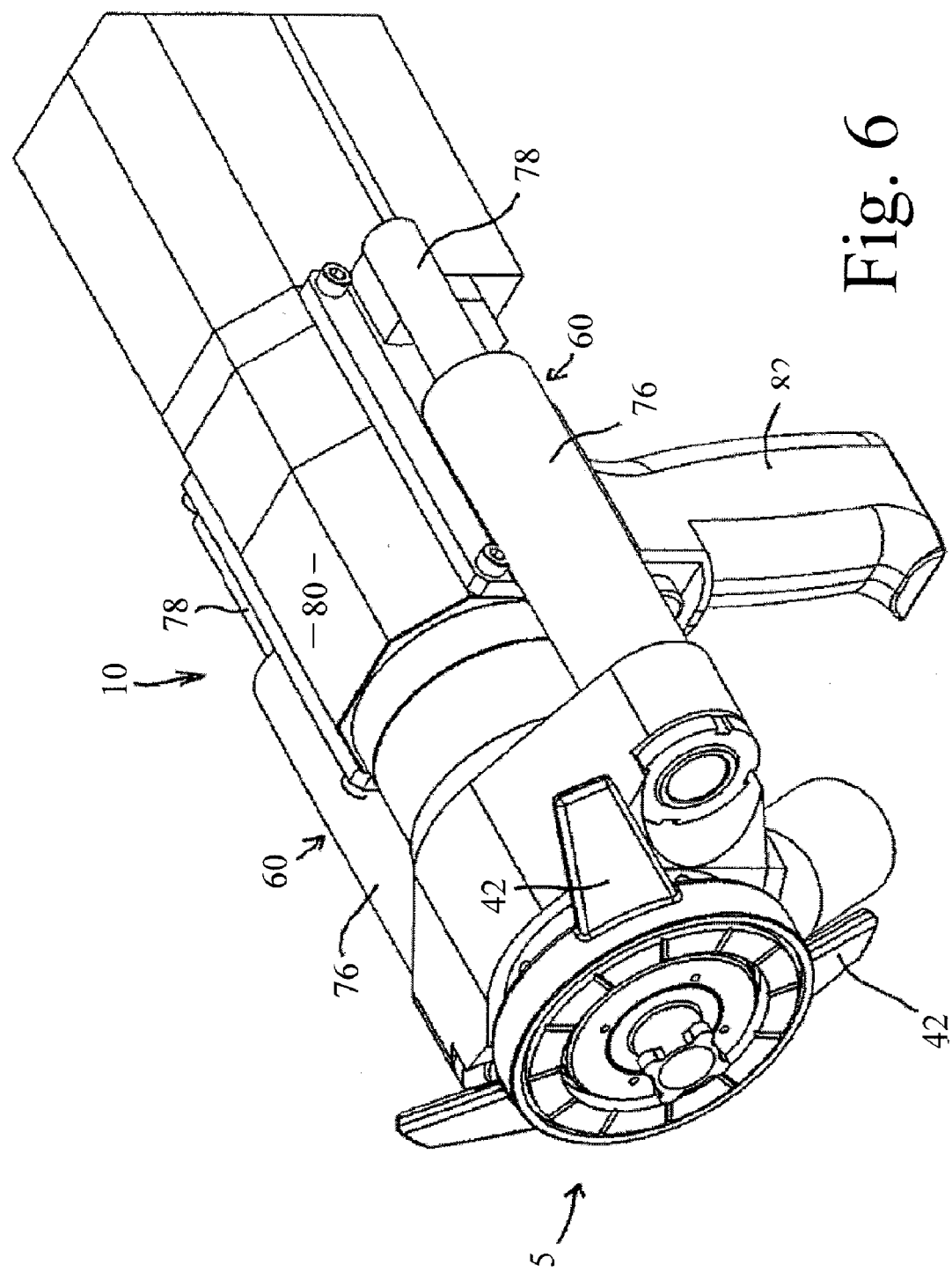
FIG. 6 is a perspective view of a hand tool apparatus to be attached to a template with the fixation device of FIGS. 1, 4 and 5.
Figure 7:
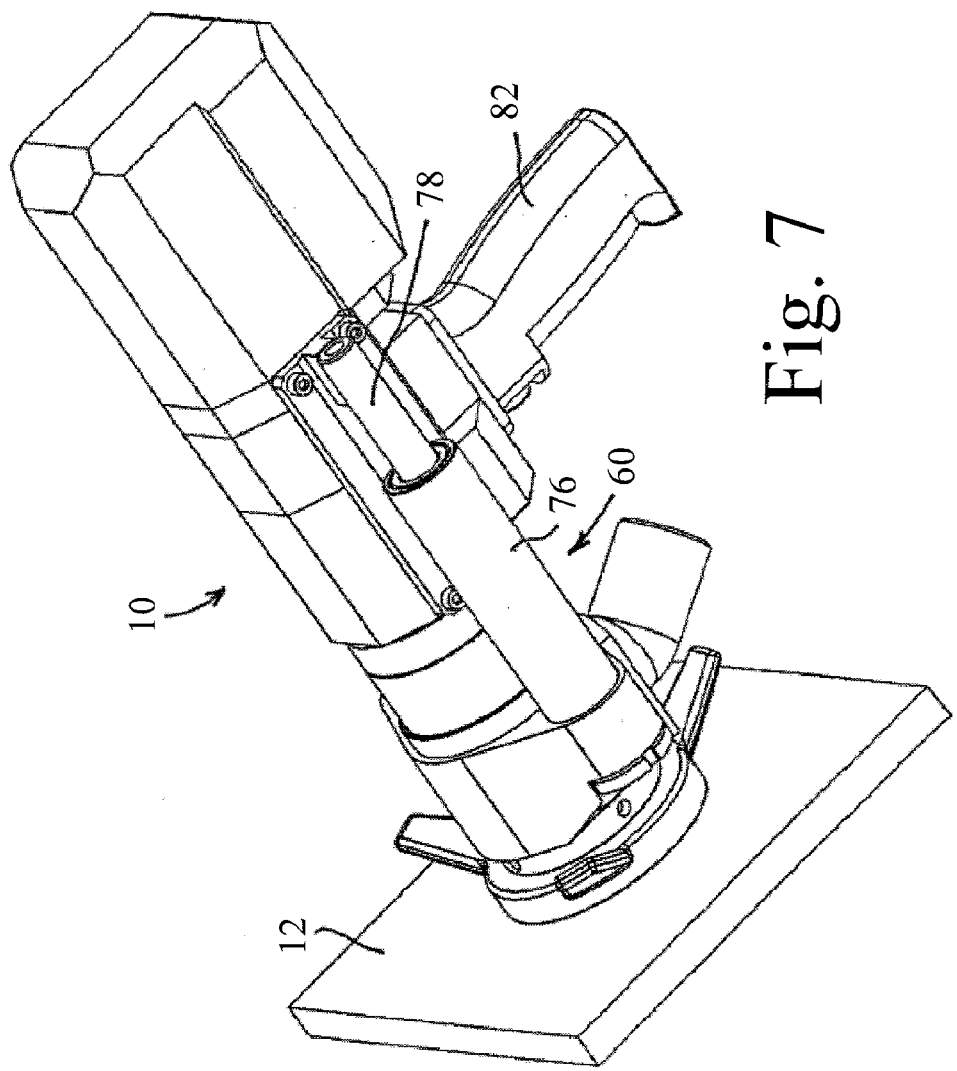
FIG. 7 is a perspective view of a hand tool apparatus attached to a template with the fixation device of FIGS. 1 and 4–6.

Now, additionally referring to FIGS. 6 and 7, there is shown a perspective view of portable orbital drilling machine 10 to which is attached fixation device 5 of the present invention, and FIG. 7 specifically shows machine 10 mounted to template 12. When mounting machine 10, or fixation device 5 separately, to template 12 for making an accurate hole in the workpiece, guide sleeve 20, of fixation device 5, is axially inserted through aperture 16 and then turned 45° so that lugs 24 come into a locking engagement with the backside of template 12. In order to obtain a stable and accurate fixation of machine 10 to template 12, tension ring 40 is turned with help of wings 42 such that socket 34 is axially displaced (rearwardly), thereby bringing lugs 24 of guide sleeve 20 to axially tighten template 12 against pressure plate 46 on the other side thereof. Alternatively, instead of using wings to achieve the axial tightening, a pneumatic assembly can be used.

Figure 9:
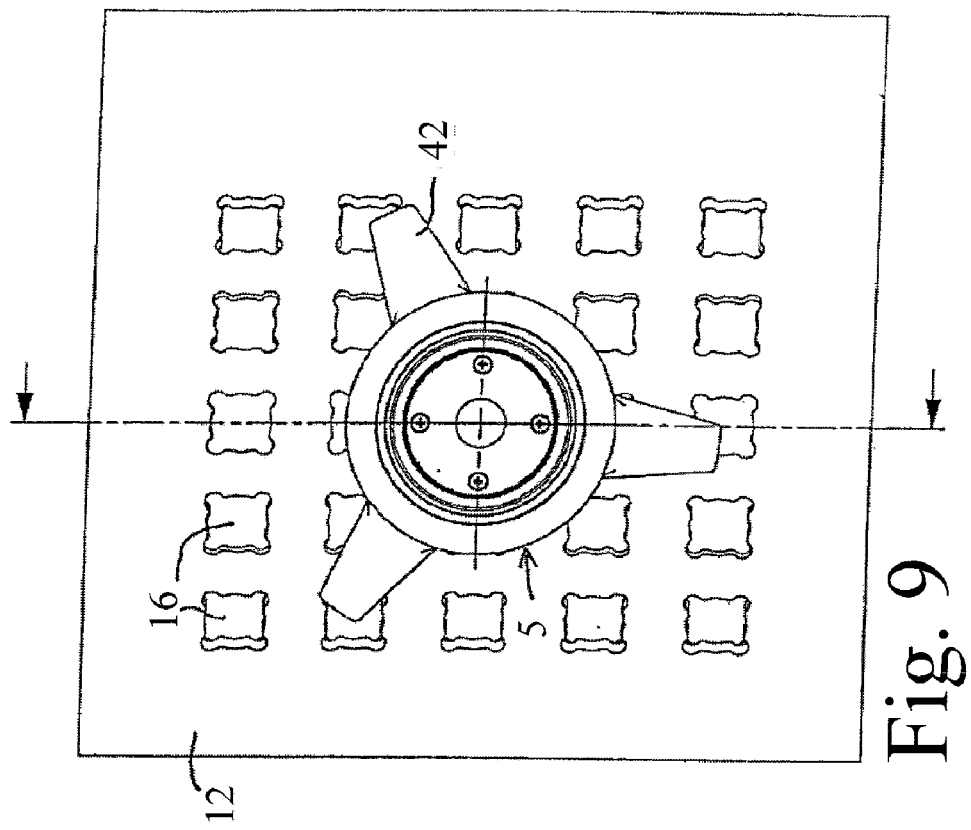
FIG. 9 is a planner view of the template of FIG. 8 and the fixation device of FIGS. 1 and 4–8.
Figure 8:
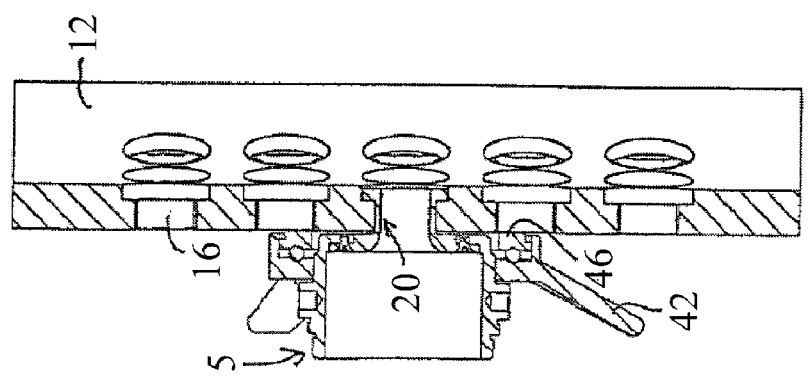
FIG. 8 is a side view, of the fixation device of FIGS. 1 and 4–7 attached to a curved template.

Now, additionally referring to FIGS. 8 and 9, there is further illustrated, in a side view and a planner view, respectively, a curved template 12 having a plurality of apertures 16 for the fixation of a drilling machine by way of fixation device 5, perpendicular to the surface of template 12.

FIG. 1 further discloses an arrangement of a mechanism for adjusting the radial offset of the longitudinal axis of cutting tool 50 of orbital drilling machine 10. Machine 10 includes a spindle motor 52 for rotating a spindle unit 54, holding tool 50 at its forward end, about its own center axis via gear mechanism 56, a radial offset adjustment mechanism, described later, an eccentric rotation mechanism 58 for orbiting cutting tool 50 about a principal axis, corresponding to the center axis of the hole to be formed, and an axial feed mechanism 60 as shown in FIGS. 6 and 7.

The radial offset mechanism includes an inner hollow cylindrical body 62 rotatably supporting spindle unit 54 therein. Spindle unit 54 is rotatably supported in an eccentric cylindrical hole in inner cylindrical body 62. The eccentric hole has a longitudinal center axis that is parallel to, but radially offset a distance from, the longitudinal center axis of inner cylindrical body 62. Eccentric inner cylindrical body 62 is, in its turn, rotatably supported within an axially extending eccentric hole of a second, outer hollow cylindrical body 64. The eccentric hole has a longitudinal center axis that is parallel to but radially offset a distance from the center axis of cylindrical body 62 (the principal axis). Preferably, the holes of cylindrical bodies 62 and 64 have the same eccentricity, i.e. the hole center axes are radially offset the same distance from the respective center axis and of bodies 62 and 64. By rotating inner cylindrical body 62 within the eccentric hole of outer cylindrical body 64, or by a mutual, relative rotation of cylindrical bodies 62 and 64, it is thus possible to locate the center axis of the eccentric hole of inner cylindrical body 62, such that it, and hence spindle unit 54 and the center axis of cutting tool 50, will coincide with the center axis of outer cylindrical body 64. By performing a mutual, relative rotation of 180° of inner and outer cylindrical bodies 62 and 64 away from this zero radial offset position, a maximum offset of the cutting tool axis is obtained.

In order to adjust the mutual rotational position of inner and outer cylinders 62 and 64 to thereby adjust the radial offset of the axis of spindle unit 54 an adjustment unit is provided at the rear end portion of inner cylinder 62 so as to be located far away from the tool working area, where dust and chips are generated, which may affect the function of the adjustment unit, and where easy access is allowed to the mechanism. For example, the adjustment unit may have the form of a worm gear mechanism, which includes a worm screw (not shown) that is rotatably supported in a block 66 and engagable with a worm wheel (not shown) fitted to inner cylindrical body 62. A scale 68, indicating the eccentricity of tool 50, i.e. the diameter value exceeding the fixed diameter of tool 50 and which generates the finished diameter of the hole to be formed, is located adjacent and rearwardly of block 66.

Drilling machine 10 further includes an improved mechanism for locking inner and outer cylindrical bodies 62 and 64 together after setting the desired eccentricity thereof. The locking mechanism includes an axially displaceable nut 70, which engages block 66 such that a tapered section 72 of the front portion of inner cylindrical body 62 will be tightened against a matching tapered surface 74 of the front portion of outer cylindrical body 64. In this manner a stabilized mutual locking of bodies 62 and 64, is obtained at a short distance from tool 50.

As best shown in FIGS. 6 and 7, axial feed mechanism 60 includes a pair of telescoping linear guide members 76 and 78 on opposite sides of outer housing 80 of drilling machine 10. Drilling machine 10 is displaced axially by help of a handle 82 and guide members 76 and 78, or by a pneumatic drive assembly (not shown).

The orbital motion of tool 50 is carried out by a motor 84, which rotates outer cylindrical body 64 via a belt transmission 86. An outlet pipe 88, for removing working dust and chips, is connectable to a vacuum source.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for temporary fixation of a portable cutting machine to a template for making at least one of holes and recesses in a workpiece, comprising:
   a guide sleeve including:
      a tubular hub with an outer diameter corresponding to an inner diameter of an aperture in the template, said tubular hub including a forward end having radially extending lugs that are shaped and located so as to match corresponding recesses in said aperture during insertion of said guide sleeve therein and to obtain locking engagement with an inner surface of the template after a partial rotation of said guide sleeve relative to the template; and
      a tubular adapter socket connected to a rearward end of said tubular hub, said tubular adapter socket mounted to a nose portion of the cutting machine; and a tensioning unit mounted to said adapter socket for axial displacement relative thereto, said tensioning unit having a forward end surface for engagement with an outer surface of the template.

2. The device of claim 1, wherein said tensioning unit includes:
   a tensioning ring axially movably attached to said adapter socket by way of a screw thread joint;
   an intermediate bearing; and
   a pressure plate configured to rest against an outer surface of the template and rotatably and axially supported relative to said tensioning ring by way of said intermediate bearing such that said pressure plate can non-rotatably engage the outer surface of the template while allowing a rotary movement of said tensioning ring relative to said adapter socket and said pressure plate.

3. The device of claim 2, wherein said tensioning ring includes wings for turning said tensioning ring relative to said adapter socket.

4. The device of claim 2, wherein said pressure plate includes:
   a plurality of ball joints; and
   at least three pressure elements which are individually articulated by said ball joints so as to be automatically adjustable to an inclination of the outer surface of the template.

5. The device of claim 1, further comprising:
   a base plate; and
   a plurality of screw joints, said hub of said guide sleeve being detachably connected to said adapter socket by way of said base plate and said screw joints.

* * * * *